March 14, 1967 H. A. KIMES 3,309,132
MOBILE CAMPER CONSTRUCTION
Filed Jan. 25, 1965 2 Sheets-Sheet 1

INVENTOR.
HOWARD A. KIMES
BY
Willard S. Grim
ATTORNEY

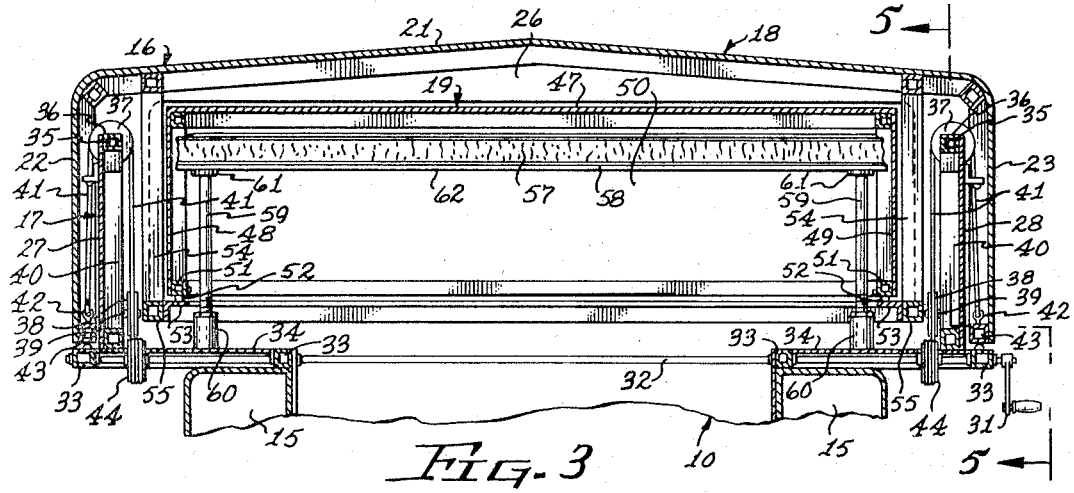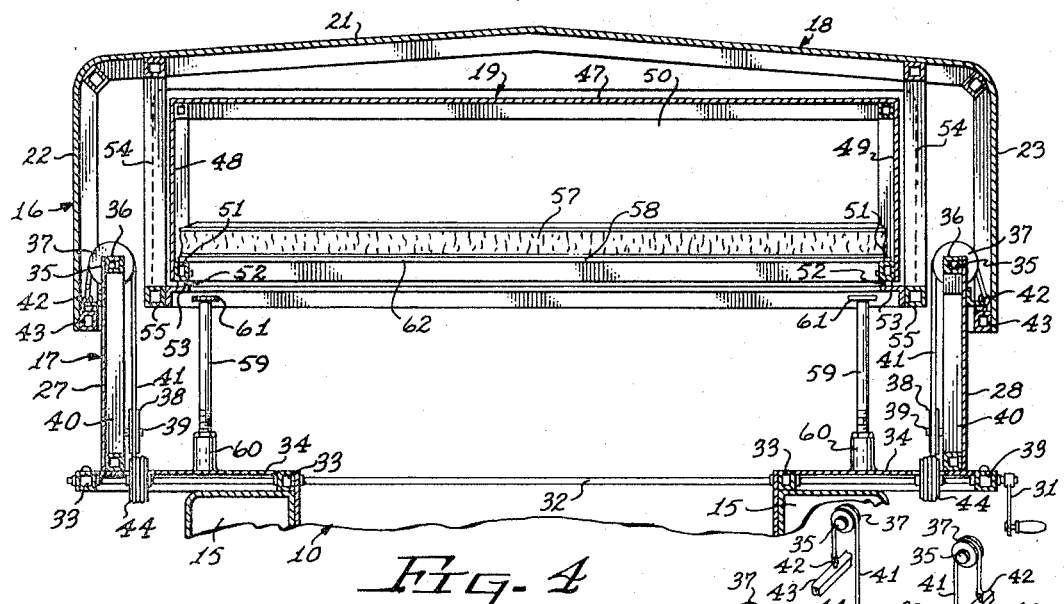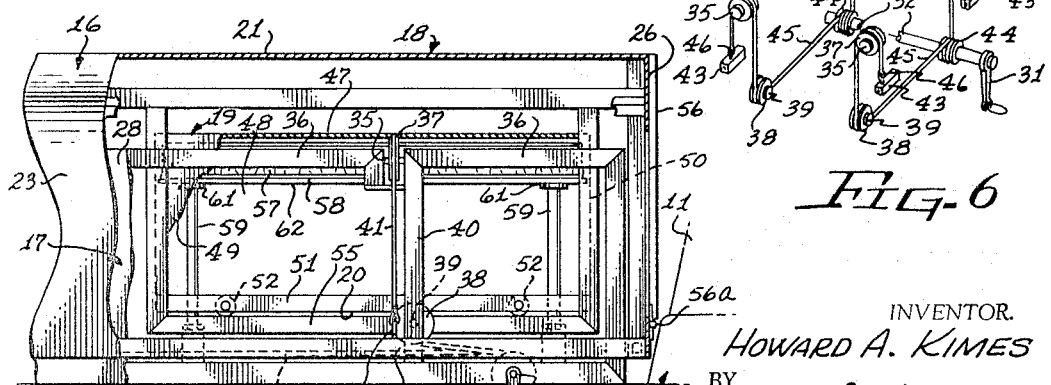

3,309,132
MOBILE CAMPER CONSTRUCTION
Howard A. Kimes, Phoenix, Ariz., assignor to
Small Business Administration
Filed Jan. 25, 1965, Ser. No. 427,560
2 Claims. (Cl. 296—23)

This invention pertains to mobile camper construction and more particularly to a new and improved construction which may be collapsed to lower the center of gravity thereof during transport and, when a camping place is reached, elevated so as to provide an enlarged and roomy enclosure area for occupancy.

One of the objects of this invention is to provide a mobile camper of collapsible construction so as to facilitate the lowering of the center of gravity of the camper during transport and the erection thereof at desired intervals and in a convenient automatic manner for maximum occupancy room collapsed.

A further object of this invention is to provide a mobile camper construction which telescopes in two directions so that the top enclosure member may be telescopically related with its bottom enclosure member and with a front enclosure member or sleeper deck having selectable vertical positioning when the unit as a whole is in collapsed road traveling position.

And a still further object is to provide a telescopic type mobile camper construction wherein maximum enclosure space is enjoyed not only during erection position but also during collapsed position so that a maximum amount of supplies and other camping gear to be hauled during transport.

Further features and advantages of this invention will appear from a detailed description of the drawings in which:

FIG. 3 is an enlarged fragmentary transverse section on the line 3—3 of FIG. 1.

FIG. 4 is an enlarged fragmentary transverse section on the line 4—4 of FIG. 2.

FIG. 5 is an enlarged fragmentary section on the line 5—5 of FIG. 3.

FIG. 6 is a diagram of the cable elevating mechanism.

Figure 1:
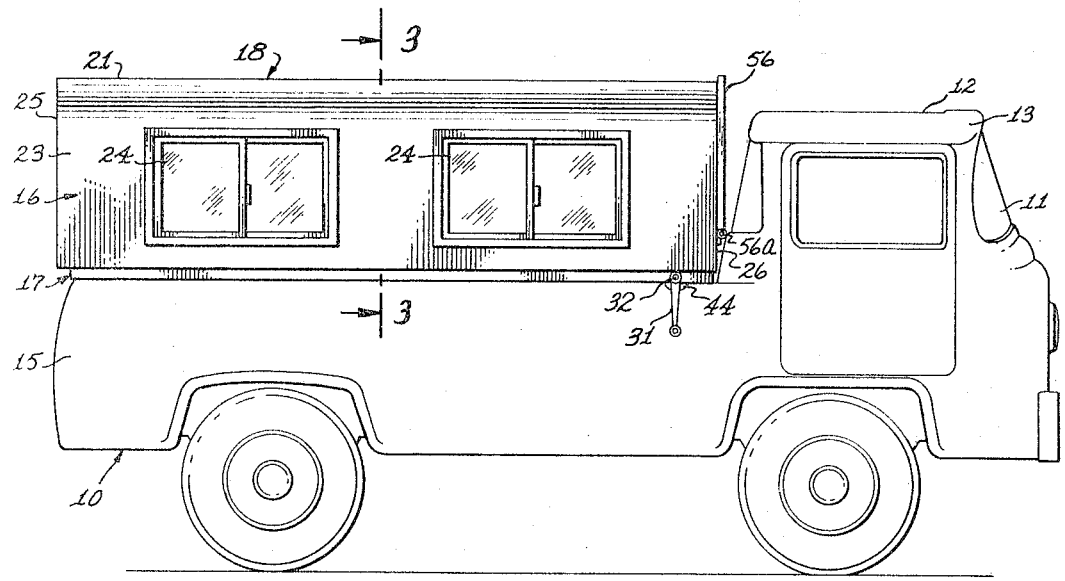
FIG. 1 is a right hand side elevation showing the mobile camper unit in collapsed position.

As an example of one embodiment of this invention, there is shown a pick-up truck 10 including a passenger cab 11 having support surface 12 which is suitably carried on the roof 13 of the cab 11. Disposed on the bed 14 and between the opposite sides 15 of the body of the pick-up is a camper construction 16 comprising a bottom enclosure member 17, a top enclosure member 18 telescopically received over the bottom enclosure member, and a front enclosure member 19. In FIG. 1 the bottom, top and front enclosure members are in retracted position for vehicle travel.

When its is desired that the enclosure within the construction 16 be enlarged, the top enclosure member 18 will be hoisted or elevated relative to the bottom enclosure member 17 and subsequently the front enclosure member 19 will be projected forwardly so that the bottom 20 of the front enclosure member 19 will engage and hence be supported by the surface 12. The top enclosure member 18 will engage and hence be supported by the surface 12. The top enclosure member 18 includes the appropriate windows 24, the rear side 25 and the front side 26 extending down over the bottom enclosure member 17 having the sides 27 and 28, the rear side 29 and the front side 30.

The top enclosure member 18 may be raised and lowered relative to the bottom enclosure member 17 by the hand crank 31 fixed on the transverse operating shaft 32 journaled in suitable bearings 33 immediately below the shelf decks 34 of the bottom enclosure member 17. Longitudinally positioned stub shafts 35 fixed in the top rails 36 of the sides 27 and 28 of the bottom enclosure 17 have idler pulleys 37 journaled thereon. Idler pulleys 38 are also journaled on transversely disposed stub shafts 39 fixed in the frame members 40 of the sides 27 and 28 of the bottom enclosure member. Front operating cables 41 have one end fixed at 42 to the lower rails 43 of the sides 22 and 23 of the top enclosure member 18 and pass up over the idler pulleys 37 and then downwardly and fixed to the wrap-up cable spools 44 fixed on the operating shaft 32. Rear operating cables 45 have one end fixed at 46 to the lower rails 43 and pass up over the idler pulley 37 and downwardly under the idler pulleys 38 and then forwardly and fixed to the wrap-up cable spools 44 so that by appropriately manipulating the hand crank 31 the top enclosure member 17 may be raised and lowered relative to the bottom enclosure member.

Figure 2:
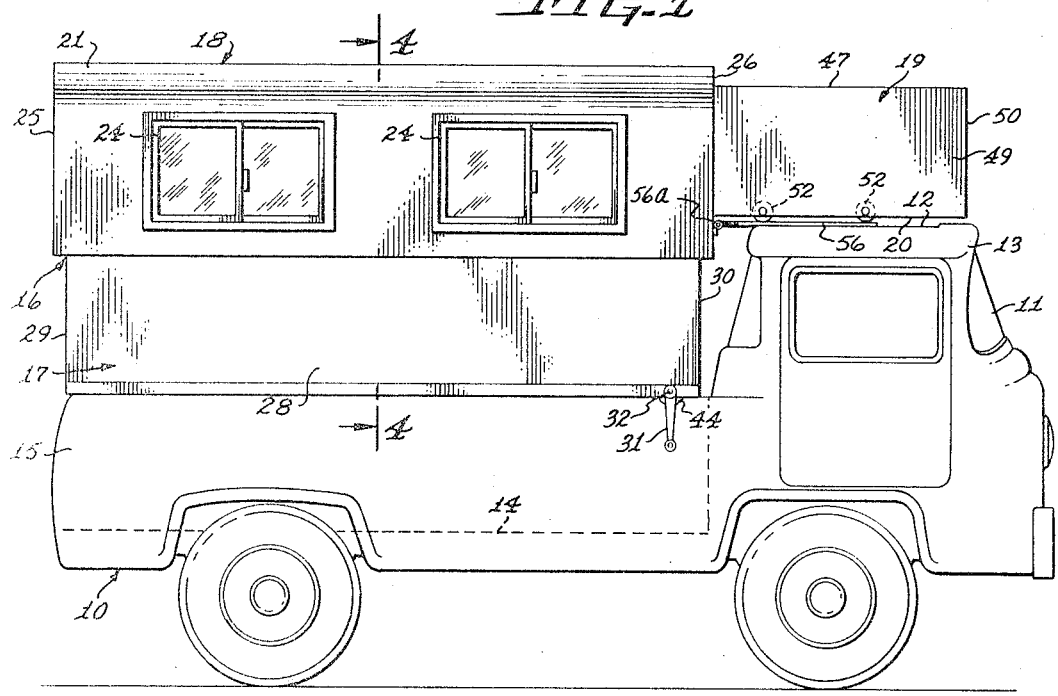
FIG. 2 is a view similar to FIG. 1 showing the mobile camper unit in fully extended position.

The front enclosure member 19 comprises a top 47, sides 48 and 49, and a front 50. Along the inner faces adjacent the lower edges of the sides 48 and 49 are the support rails 51 in which are journaled the support rollers 52 which roll on the guide tracks 53 fixed along the lower tie bars 55 of the carrying frames 54 fixed to the top 21 of the top enclosure member 18. When the top enclosure member 18 is in raised position, FIGS. 2 and 4, the front enclosure member may be moved out horizontally through the downwardly swinging trap door 56 pivotally hinged at 56a to the front of the top enclosure member and resting on the support surface 12 of the cab roof 13 for sleeping purposes.

A bed mattress 57 is carried on a floating or telescoping bed plate 58 which is normally supported on the support rails 51 when the front enclosure member 19 is in raised position with the top enclosure member 18. When the front enclosure member 19 is returned inwardly into the top enclosure member 18 and the top enclosure member 18 lowered, posts 59, demountably carried in suitable supports 60 fixed to the shelf decks 34 and having abutment pads 61, engage the underside 62 of the bed plate 58 so as to maintain the mattress 57 in substantially fully elevated position, FIG. 3, when the top enclosure member is in fully lowered position. Thus, headroom is provided under the mattress plate 58 to thereby greatly enhance the usable room area in the camper when in collapsed condition for road travel. It is to be further noted that the posts 59 may be removed from their supports 60 when the top enclosure member is in raised position, FIG. 4, so that when the top enclosure member is again lowered the mattress bed plate 58 is also lowered to rest on the supports 60 so that the bed can then be used with the camper in collapsed position.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. A mobile camper construction comprising in combination:
  (A) a top enclosure member,
  (B) a bottom enclosure member,
  (C) means for selectively elevating said top enclosure member relative to said bottom enclosure member to enlarge the enclosure space mutually defined by said top and bottom enclosure members, (D) a front enclosure member telescopically received within said enclosure member, means for selectively forwardly extending the front enclosure member, when said top enclosure member is hoisted by said first mentioned means, to further enlarge the enclosure defined by said top, bottom and front enclosure members, (E) a mattress supporting means carried within and relatively vertically movable in said front enclosure member, (F) upwardly extending means on said bottom enclosure member adapted to supportingly engage said mattress supporting means in raised position when said front enclosure member is within said top enclosure member and said top enclosure member moves downwardly relative to said bottom enclosure member.

2. A mobile camper construction comprising in combination:
(A) a top enclosure member,
(B) a bottom enclosure member,
(C) means for selectively elevating said top enclosure member relative to said bottom enclosure member to enlarge the enclosure space mutually defined by said top and bottom enclosure members,
(D) a front enclosure member telescopically received within said enclosure member, means for selectively forwardly extending the front enclosure member, when said top enclosure member is hoisted by said means, first mentioned said top to further enlarge the enclosure defined by said top, bottom and front enclosure members,
(E) a mattress supporting means carried within and relatively vertically movable in said front enclosure member,
(F) demountable posts mounted on said bottom enclosure member selectively adapted to supportingly engage said mattress supporting means in raised position when said front enclosure member is within said top enclosure member and said top enclosure member moves downwardly relative to said bottom enclosure member.

References Cited by the Examiner
UNITED STATES PATENTS 3,000,664   9/1961   Martin.
3,145,046   8/1964   Orn _____ 296—26

BENJAMIN HERSH, *Primary Examiner.*

P. GOODMAN, *Assistant Examiner.*